(12) United States Patent
Cho et al.

(10) Patent No.: US 12,434,829 B2
(45) Date of Patent: Oct. 7, 2025

(54) TILT PROP AIRCRAFT

(71) Applicant: KOREA AEROSPACE RESEARCH INSTITUTE, Daejeon (KR)

(72) Inventors: Jun Ho Cho, Daejeon (KR); Myeong Kyu Lee, Daejeon (KR); Seong Wook Choi, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 143 days.

(21) Appl. No.: 18/450,097

(22) Filed: Aug. 15, 2023

(65) Prior Publication Data

US 2024/0092484 A1 Mar. 21, 2024

(30) Foreign Application Priority Data

Sep. 21, 2022 (KR) .......................... 10-2022-0119006

(51) Int. Cl.
*B64C 29/00* (2006.01)
*B64C 13/30* (2006.01)
*B64C 13/34* (2006.01)

(52) U.S. Cl.
CPC .......... *B64C 29/0033* (2013.01); *B64C 13/30* (2013.01); *B64C 13/34* (2013.01)

(58) Field of Classification Search
CPC ...... B64C 29/0033; B64C 13/30; B64C 13/34
See application file for complete search history.

(56) References Cited

U.S. PATENT DOCUMENTS

| 2,468,913 | A | * | 5/1949 | Avery | ................ | B64C 29/0033 244/7 R |
| 2,702,168 | A | * | 2/1955 | Platt | ................... | B64C 29/0033 244/7 R |
| 3,486,717 | A | * | 12/1969 | Paine | ................. | B64C 29/0033 416/102 |
| 3,567,157 | A | * | 3/1971 | Dancik | ............... | B64C 29/0033 244/12.4 |
| 3,766,790 | A | * | 10/1973 | Weir | ................... | B64C 29/0033 475/8 |
| 5,054,716 | A | * | 10/1991 | Wilson | .................. | B64D 35/00 244/66 |

(Continued)

FOREIGN PATENT DOCUMENTS

KR 101849246 B1 4/2018

*Primary Examiner* — William L Gmoser
(74) *Attorney, Agent, or Firm* — Rabin & Berdo, P.C.

(57) ABSTRACT

A tilt prop aircraft is provided, including a first longitudinal support member and a second longitudinal support member capable of tilting relatively to each other, a tilt actuator disposed on the second longitudinal support member, a first power transmission member rotated by the tilt actuator, a second power transmission member fixed to the first longitudinal support member and coupled to the first power transmission member to transmit a rotational movement of the first power transmission member by turning 90 degrees in different planes, a crank fixed to the second longitudinal support member and extending through a slot in the first longitudinal support member and protruding inwardly from the first longitudinal support member, and a connecting rod connected to the crank so as to be relatively rotatable to the crank, and connected to the pitch control rod.

7 Claims, 7 Drawing Sheets

(56) References Cited

U.S. PATENT DOCUMENTS

| | | | |
|---|---|---|---|
| 6,276,633 B1* | 8/2001 | Balayn | B64C 29/0033 |
| | | | 244/56 |
| 6,896,221 B1* | 5/2005 | Einarsson | B64C 5/08 |
| | | | 244/12.4 |
| 11,724,802 B1* | 8/2023 | Messinger | B64C 29/0033 |
| | | | 244/7 C |
| 11,780,576 B1* | 10/2023 | Groninga | B64C 3/00 |
| | | | 244/6 |
| 2003/0094537 A1* | 5/2003 | Austen-Brown | B64C 27/28 |
| | | | 244/7 R |
| 2004/0038768 A1* | 2/2004 | Thomassey | B64C 27/12 |
| | | | 475/221 |
| 2018/0155019 A1* | 6/2018 | Lee | B64C 29/0033 |
| 2019/0329882 A1* | 10/2019 | Baity | B64U 30/14 |
| 2020/0031488 A1* | 1/2020 | King | B64C 3/187 |
| 2020/0331602 A1* | 10/2020 | Mikic | B64C 13/16 |
| 2022/0388650 A1* | 12/2022 | Mills | B64C 29/02 |
| 2024/0116629 A1* | 4/2024 | Storrs | B64C 11/32 |

* cited by examiner

TILT PROP AIRCRAFT

CROSS-REFERENCE TO RELATED APPLICATION

This application claims priority under 35 U.S.C. § 119 to Korean Patent Application No. 10-2022-0119006, filed in the Korean Intellectual Property Office on Sep. 21, 2022, the entire contents of which are hereby incorporated by reference.

BACKGROUND

Technical Field

The present disclosure relates to a tilt prop aircraft, and to a tilt prop aircraft without a separate pitch actuator, in which a linkage structure is used so that tilt angle and pitch are mechanically interoperated only by a tilt actuator, and which is particularly capable of non-linear pitch control.

Description of the Related Art

Tilt prop aircraft is a convertible aircraft capable of vertical take-off and landing and high-speed flight. An electrically-driven vertical take-off and landing aircraft developed for the purpose of urban air mobility (UAM) has the characteristic that it is capable of vertical take-off and landing and also cruising flight.

Because the thrust vector required for vertical take-off and landing and cruising flight is different to each other, a tilt device is used to adjust the thrust vector by tilting the rotational plane of the propeller (or the axis of rotation of the rotor) forward as the flight speed increases.

Because the required thrust varies depending on the tilt angle, RPM control method for adjusting the rotational speed of the propeller, and pitch control method for adjusting the pitch (blade angle) of the propeller are used in order to adjust the thrust.

A tilt-type variable pitch propeller is provided, which refers to a propulsion system incorporating both of tilt control and pitch control on the rotational plane of the propeller.

FIG. 1 illustrates an example of a tilt prop aircraft with four rotors mounted on the front, and FIG. 2 illustrates a schematic view of a related tilt-type variable pitch propeller. For convenience of description, embodiments will be mainly described based on differences in configuration from the related tilt-type variable pitch propeller. For reference, reference numeral 200 denotes a motor.

The related tilt-type variable pitch propeller is provided with two actuators 300 and 400 performing tilt control and pitch control, respectively. That is, pitch of a propeller 100 is controlled using the pitch actuator 300, and tilt of a rotor is controlled using the tilt actuator 400.

For reference, pitch angle of the propeller is changed as a pitch control rod 900 (so called, push rod) moves up and down along the rotational axis of the rotor. The configuration of adjusting the pitch angle of the propeller through the movement of the pitch control rod 900 described above can be used with various types of already known structures.

In order to adjust the tilt of the rotor, the tilt actuator 400 disposed on a longitudinal support member 600 operates a tilt worm gear 700, and a tilt worm wheel gear 800 geared with the tilt worm gear 700 and disposed on a longitudinal support member 500 is rotated around its central axis, so that the rotor is tilted.

As such, the related tilt-type variable pitch propeller requires the pitch actuator 300 and the tilt actuator 400, respectively, and also requires the avionics system for controlling the same. Addition of such equipment not only increases weight of the aircraft, but also increases a number of failure factors due to complexity of the system, thereby reducing stability.

Another example of related art can be found in Korea Patent Registration No. 10-1849246 which discloses a 'Tilt prop aircraft'.

According to the tilt prop aircraft disclosed in KR10-1849246, the pitch angle increases 'linearly' in proportion to the angle by which the prop rotational plane is tilted forward. For reference, the required thrust of the tilt prop aircraft is large during vertical take-off, decreases when tilting forward, and increases again when the aircraft reaches a certain speed. However, in the tilt prop aircraft disclosed in KR10-1849246, when the tilt angle and the pitch angle are linearly interoperated, there is a speed section during which the interoperation involves a high pitch angle for a low required thrust, and it is necessary to lower the rotational speed so as to generate proper thrust. As such, a problem may occur in which the motor has to rotate at a low speed with a high torque in order for the rotor to rotate at a low RPM.

SUMMARY

The present disclosure is to solve the problems of the related art described above, and it is an object of the present disclosure to provide a tilt prop aircraft without a separate pitch actuator, in which a linkage structure is used so that tilt angle and pitch are mechanically interoperated only by a tilt actuator, and which is particularly capable of non-linear pitch control.

In order to achieve the objects mentioned above, a tilt prop aircraft is provided, which may include a pitch control rod which changes pitch angle of a propeller while moving up and down along a rotational axis of a rotor, in which the tilt prop aircraft may include a first longitudinal support member and a second longitudinal support member capable of tilting relatively to each other, a tilt actuator disposed on the second longitudinal support member, a first power transmission member rotated by the tilt actuator, a second power transmission member fixed to the first longitudinal support member and coupled to the first power transmission member to transmit a rotational movement of the first power transmission member by turning 90 degrees in different planes, a crank fixed to the second longitudinal support member and extending through a slot in the first longitudinal support member and protruding inwardly from the first longitudinal support member, and a connecting rod connected to the crank so as to be relatively rotatable to the crank, and connected to the pitch control rod.

In addition, the pitch angle may be non-linearly controlled while the rotor is tilted from 0 degree to 90 degrees.

In addition, the slot may be formed along a moving path of the crank while the rotor is tilted from 0 degree to 90 degrees.

In addition, while tilt angle changes from 90 degrees to a predetermined angle, the pitch control rod may be moved in an upward direction by the connecting rod and the crank and the pitch angle of the propeller may be decreased, and while the tilt angle changes from the predetermined angle to 0 degree, the pitch control rod may be moved in a downward direction by the connecting rod and the crank and the pitch angle of the propeller may be increased.

In addition, the predetermined angle may be determined by adjusting length of the connecting rod and position of the crank.

In addition, the first longitudinal support member may be a tilt member, and the second longitudinal support member may be a pod member.

In addition, the first power transmission member may be a first gear, the second power transmission member may be a second gear, and the first gear and the second gear may be geared with each other.

In addition, the first gear may be a tilt worm gear, and the second gear may be a tilt worm wheel gear.

Advantageous Effects

The tilt prop aircraft having the above configuration according to various embodiments has following effects.

According to various embodiments, since the propeller pitch is non-linearly adjusted through a linkage, that is, through a configuration of the crank and the connecting rod interoperable with tilt angle, it is possible to use only the tilt actuator and achieve the same function as provided in the related art. Therefore, since the pitch actuator is omitted, it is possible to reduce weight of the aircraft, and further, since the avionics system related with the pitch actuator can be eliminated, the system can be simplified, and probability of failure is reduced and safety increases.

Meanwhile, although the present disclosure is not explicitly described, it also includes other effects that can be expected from the configuration described above.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Hereinafter, preferred embodiments of the present disclosure will be described in detail with reference to the accompanying drawings, which will be readily apparent to those skilled in the art to which the present disclosure pertains. However, the description proposed herein is just a preferable example for the purpose of illustrations only, not intended to limit the scope of the disclosure, so it should be understood that other equivalents and modifications could be made thereto without departing from the scope of the disclosure.

Figure 3:
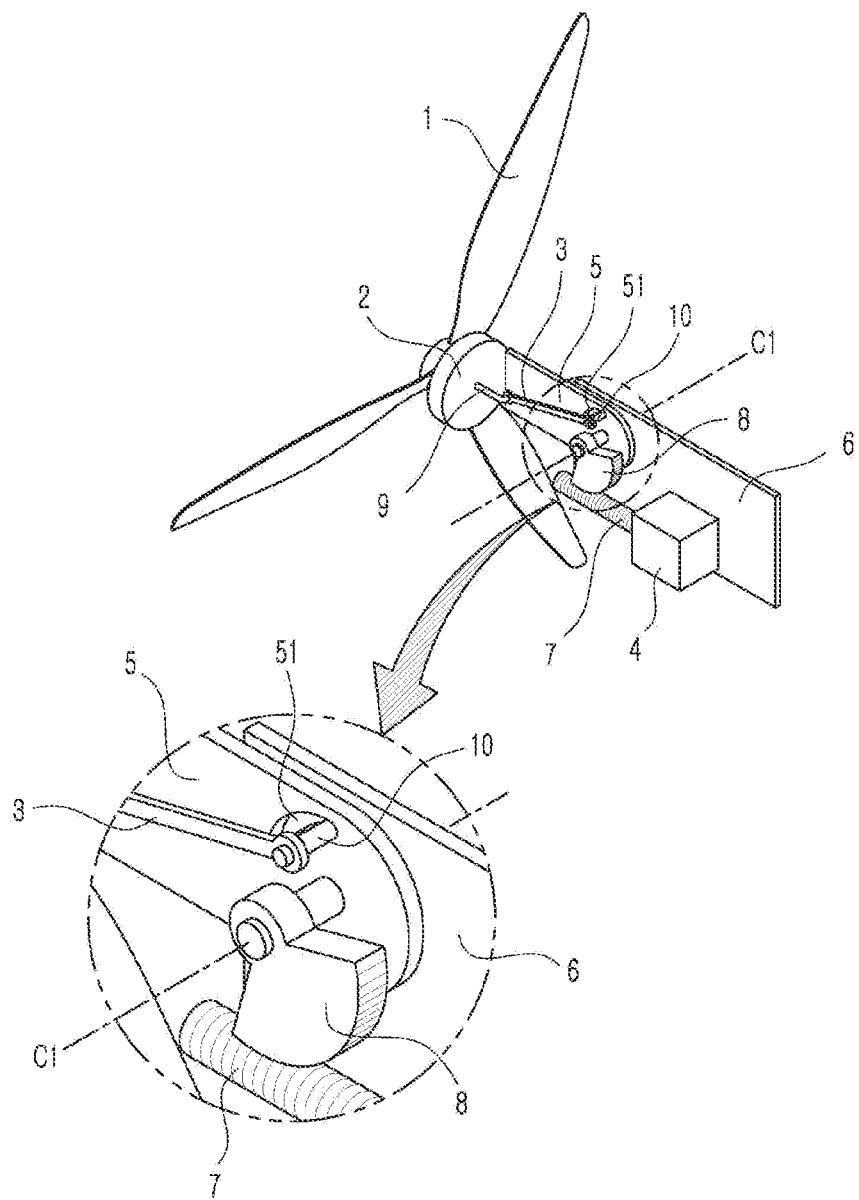
FIG. 3 is a schematic view showing a main configuration of a tilt-type variable pitch propeller of a tilt prop aircraft according to an embodiment.

FIG. 3 is a schematic view showing a main configuration of a tilt-type variable pitch propeller of a tilt prop aircraft according to an embodiment. For reference, reference numeral 2 denotes a motor. Hereinbelow, embodiments will be described mainly based on the configuration different from that of the related tilt-type variable pitch propeller described above, and for convenience of explanation, the known configuration will be omitted or explained briefly so as not to obscure essence of the present disclosure.

The tilt prop aircraft according to an embodiment includes a pitch control rod 9 (so called, push rod) that changes a pitch angle of a propeller 1 while moving up and down along a rotational axis of the rotor. For the configuration of adjusting the pitch angle of the propeller through vertical movement of the pitch control rod 900 along the rotational axis of the rotor may be used with various types of the known structures.

Further, as shown in FIG. 3, the tilt prop aircraft according to an embodiment includes, as main components, a first longitudinal support member 5 and a second longitudinal support member 6, a tilt actuator 4, a first power transmission member 7, a second power transmission member 8, a crank 10, and a connecting rod 3.

The first longitudinal support member 5 and the second longitudinal support member 6 can be tilted relatively to each other. In an example, the first longitudinal support member 5 may be a tilt member, and the second longitudinal support member 6 may be a pod member. For reference, the tilt angle of the rotor may refer to an angle between the ground and the rotational axis of the rotor. The tilt angle of 90 degrees during take-off and landing, 0 degree during cruising, and 0 degree to 90 degrees when transiting from take-off to cruising (or from cruising to landing) can be maintained.

The tilt actuator 4 is disposed on the second longitudinal support member 6. According to an embodiment, only the tilt actuator 4 is provided, and the pitch actuator 300 (see FIG. 2) of the related tilt prop aircraft is not provided.

The first power transmission member 7 and the second power transmission member 8 are components that transmit rotational movement between two axes located in different planes and perpendicular to each other.

Specifically, the first power transmission member 7 may be a first gear 7, and the first gear 7 may be rotated by the tilt actuator 4. The second power transmission member 8 may be a second gear 8, and the second gear 8 may be fixed to the first longitudinal support member 5 and geared with the first gear 7 to transmit a rotational movement of the first power transmission member by turning 90 degrees in different planes. In an example, the first gear 7 may be a tilt worm gear, and the second gear 8 may be a tilt worm wheel gear.

Figure 4A:
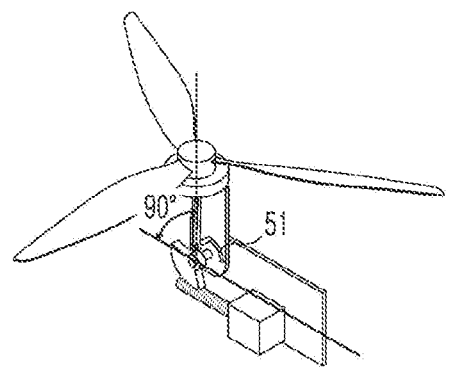
FIG. 4A is a schematic view showing the tilt prop aircraft of FIG. 3 tilted by 90 degrees.
Figure 4B:
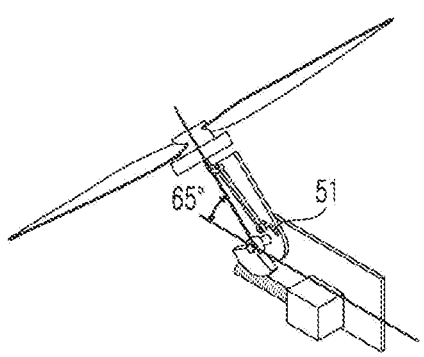
FIG. 4B shows the tilt prop aircraft tilted by 65 degrees.
Figure 4C:
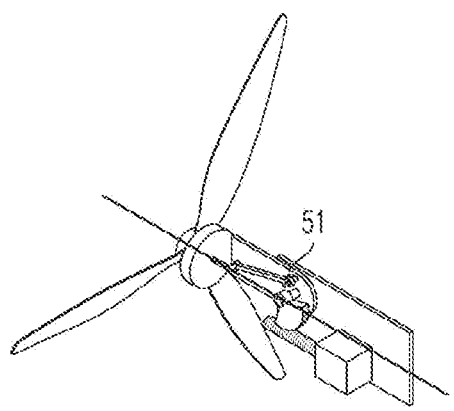
FIG. 4C shows the tilt prop aircraft tilted by 0 degree.

The crank 10 is fixed to the second longitudinal support member 6 and protrudes inwardly from the first longitudinal support member 5 through a slot 51 of the first longitudinal support member 5. As shown in FIG. 4, the slot 51 is formed along a moving path of the crank 10 while the rotor is tilted from 0 degree to 90 degrees.

The crank 10 is fixed to the second longitudinal support member 6 which does not tilt, and corresponds to a fixed point that is fixed at a constant position regardless of tilt angle. Although the crank 10 is fixed, as the rotor tilts, the effect of rotating relative to the connecting rod 3 can be obtained.

Figure 7:
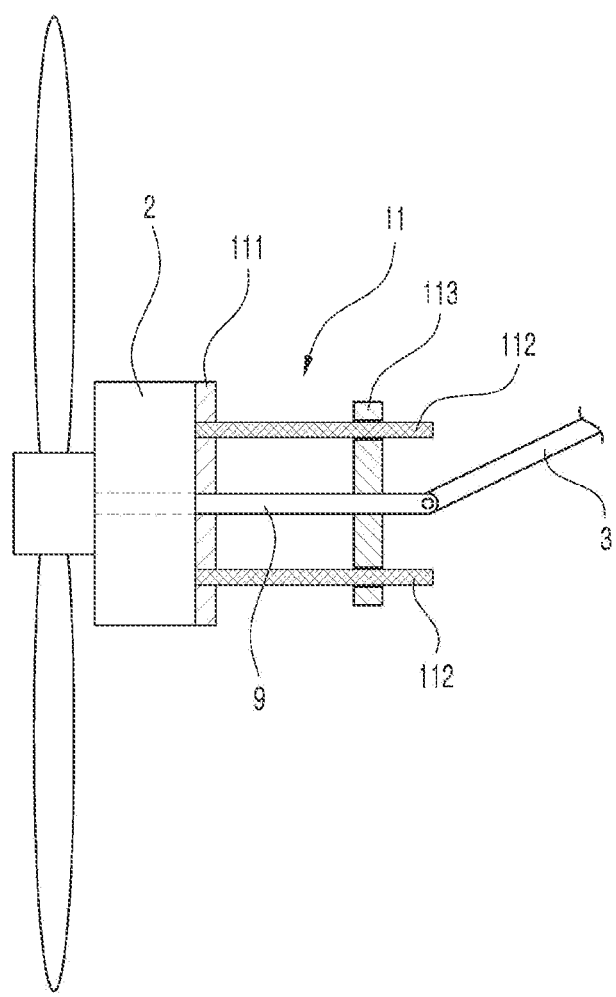
FIG. 7 illustrates an example of a known pitch control rod guide.

The connecting rod 3 is rotatably connected to the crank 10 and the known pitch control rod 9 (so called, push rod), and plays a role of converting the relative rotation movement of the crank 10 into linear movement of the pitch control rod 9. The pitch control rod 9 may be restricted to the linear movement only by a known pitch control rod guide. For example, as shown in FIG. 7, a known pitch control rod guide 11 may include a linear moving member 113 fixedly connected to the pitch control rod 9 and moving up and down along the rotational axis of the rotor together with the pitch control rod 9, a guide bar 112 penetrating and supporting the linear moving member 113 and with respect to which the linear moving member 113 is relatively moved, and a fixing member 111 fixed to the guide bar 112.

Meanwhile, according to this embodiment, the pitch angle of the propeller is controlled non-linearly while the rotor (rotational plane of the propeller) is tilted from 0 degree to 90 degrees through a linkage, that is, through the crank 10 and the connecting rod 3.

Hereinbelow, operation of the tilt prop aircraft having the configuration described above according to an embodiment will be described in comparison with the related tilt prop aircraft.

Figure 1:
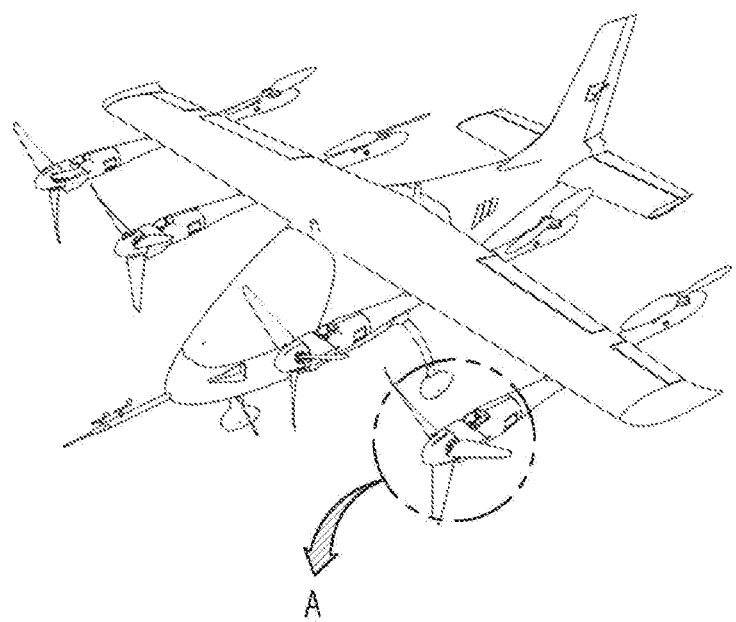
FIG. 1 is a schematic view of a tilt prop aircraft.
Figure 2:
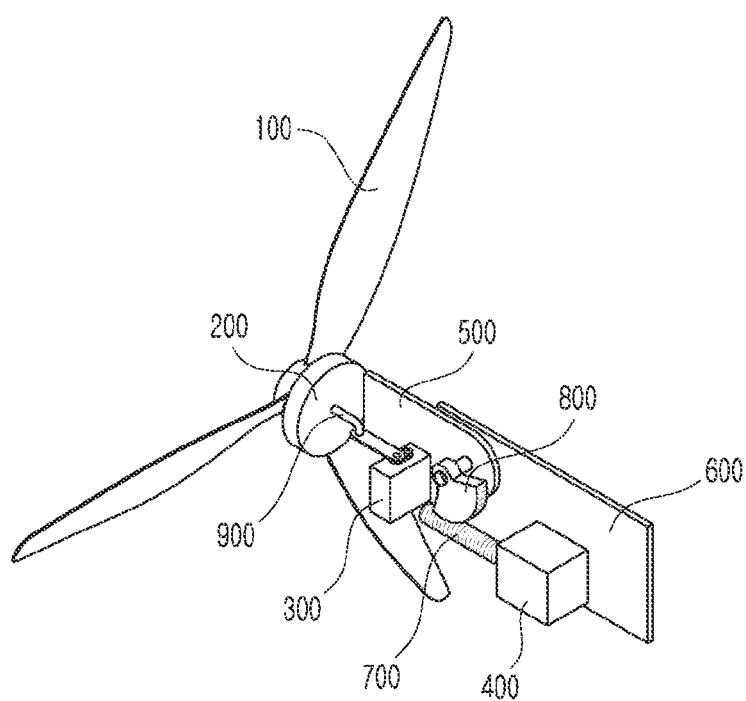
FIG. 2 is an enlarged view of an encircled part A of FIG. 1, schematically showing a main configuration of a tilt-type variable pitch propeller of a related tilt prop aircraft.

In the related art, as shown in FIG. 2, actuators 300 and 400 are separately used to adjust tilt and pitch. However, according to an embodiment, since pitch of the propeller is adjusted through the linkage, that is, through the crank 10 and the connecting rod 3 that are interoperated with the tilt angle, as shown in FIG. 3, it is possible to use only the tilt actuator 4 and can achieve the same function as provided by the related art. Therefore, since the pitch actuator is omitted, it is possible to reduce weight of the aircraft, and further, since the avionics system related with the pitch actuator can be eliminated, the system can be simplified, and probability of failure is reduced and safety increases.

Particularly, in an aircraft with the tilting rotor, the required thrust decreases and again increases upon tilting, and therefore, it is necessary to adjust the pitch angle 'non-linearly'.

Figure 5:
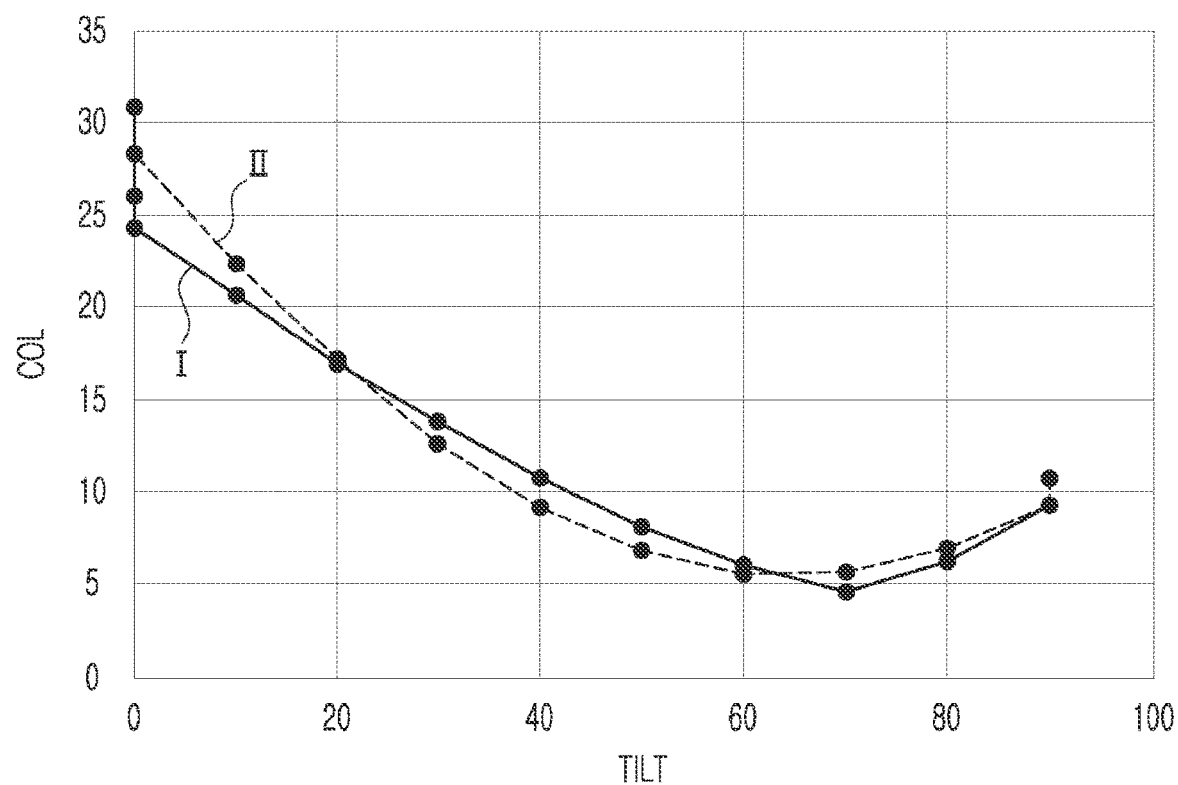
FIG. 5 shows result of pitch control of the tilt prop aircraft of FIG. 3.

Referring to FIG. 5, when comparing the related tilt prop aircraft I that controls tilt and pitch of the propeller respectively, with the tilt prop aircraft II according to an embodiment, it can be seen that similar non-linear control effects are achieved.

Figure 6:
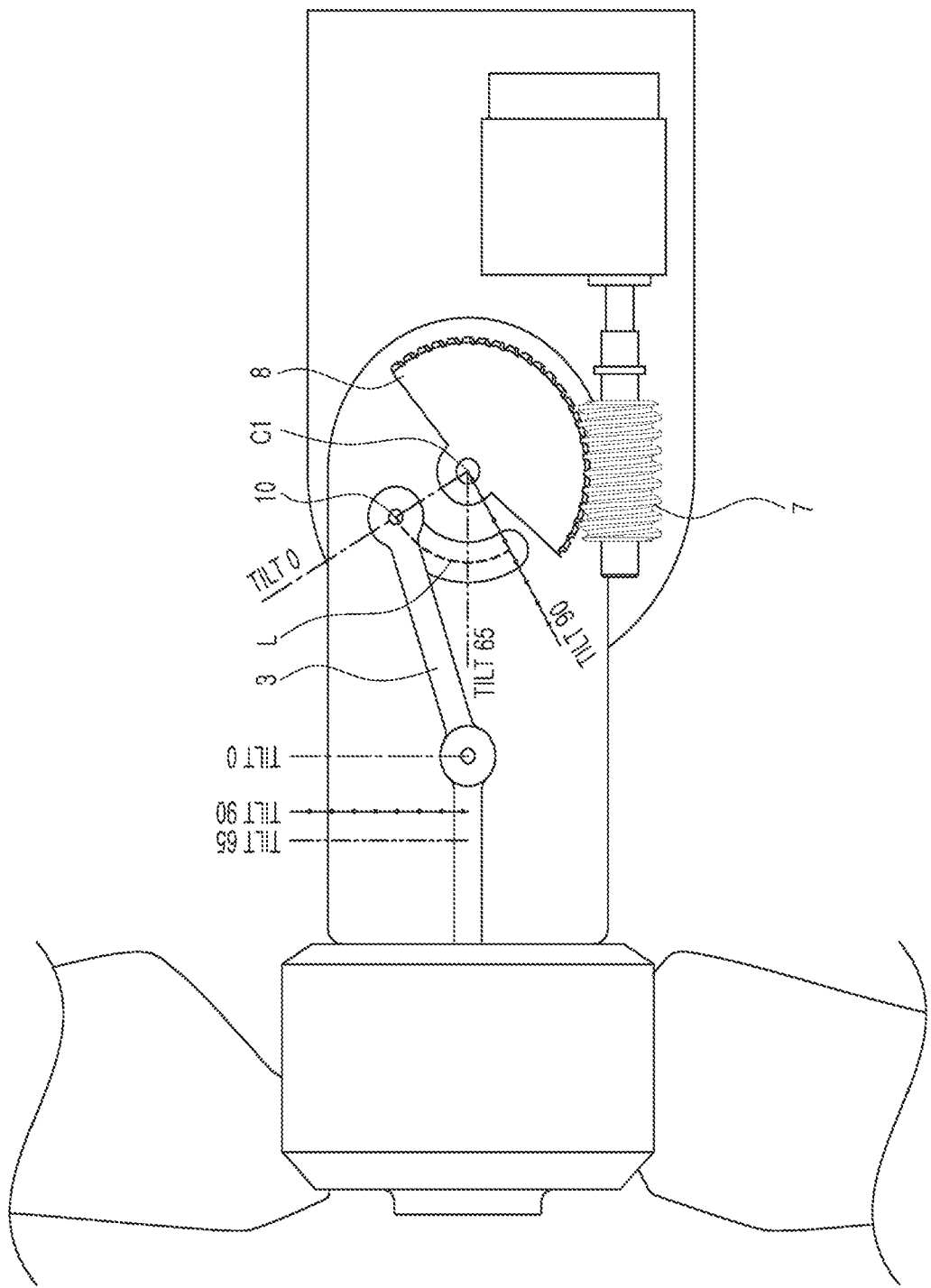
FIG. 6 is a schematic view provided to explain linkage action of the tilt prop aircraft of FIG. 3.

FIG. 6 is a schematic view showing an operation of adjusting pitch angle of the propeller non-linearly by interoperation with the tilt, according to an embodiment.

Referring to FIG. 6, the crank 10 (fixed point) is fixed to the second longitudinal support member 6 which is not tilted, and the rotor is tilted from 90 degrees to 0 degree, rotating along a trajectory shown in dotted line L. The connecting rod 3 is located on the first longitudinal support member 5 which can be tilted, and connected at both ends to the control rod 9 whose movement is restricted to a direction of controlling pitch, and to the crank (fixed point).

While the tilt angle changes from 90 degrees to 65 degrees (from FIG. 4A to FIG. 4B), the pitch control rod 9 is moved forward (to a direction closer to the propeller) by the linkage (the connecting rod and the crank), such that the pitch angle of the propeller is decreased.

While the tilt angle changes from 65 degrees to 0 degree (from FIG. 4B to FIG. 4C), the pitch control rod 9 is moved backward (to a direction away from the propeller) by the linkage (the connecting rod and the crank), such that the pitch angle of the propeller is increased.

Meanwhile, the range of the pitch angle of the propeller, and the tilt angle with which the pitch angle becomes the minimum should be set properly according to the features of the tilt prop aircraft. This can be adjusted according to length of the connecting rod 3 and position of the crank 10 (fixed point). The range of the propeller pitch angle can be adjusted with a ratio of a distance between a tilt central axis C1 and the crank 10 (fixed point) and a length of the connecting rod 3. In order to set the tilt angle at which the pitch angle of the propeller becomes the minimum, it is necessary to position the crank 10 (fixed point) such that the crank 10 corresponds to the central axis of the prop (the rotor) at the minimum tilt angle.

Meanwhile, according to an embodiment, it is possible to implement a non-linear pitch control interoperable with tilt, which is applicable to any variable pitch propeller propulsion system that allows tilt.

Although the present invention has been described in connection with some examples herein, the present invention should not be limited to those examples only, and various other changes and modifications made by those skilled in the art from the basic concept of the disclosure are also within the scope of the claims appended herein.

The invention claimed is:

1. A tilt prop aircraft comprising a pitch control rod which changes pitch angle of a propeller while moving up and down along a rotational axis of a rotor, the tilt prop aircraft comprising:
    a first longitudinal support member and a second longitudinal support member capable of tilting relatively to each other;
    a tilt actuator disposed on the second longitudinal support member;
    a first power transmission member rotated by the tilt actuator;
    a second power transmission member fixed to the first longitudinal support member and coupled to the first power transmission member to transmit a rotational movement of the first power transmission member by turning 90 degrees in different planes;
    a crank fixed to the second longitudinal support member and extending through a slot in the first longitudinal support member and protruding inwardly from the first longitudinal support member; and
    a connecting rod connected to the crank so as to be relatively rotatable to the crank, and connected to the pitch control rod.

2. The tilt prop aircraft of claim 1, wherein the pitch angle is non-linearly controlled while the rotor is tilted from 0 degree to 90 degrees.

3. The tilt prop aircraft of claim 2, wherein the slot is formed along a moving path of the crank while the rotor is tilted from 0 degree to 90 degrees.

4. The tilt prop aircraft of claim 3, wherein, while tilt angle changes from 90 degrees to a predetermined angle, the pitch control rod is moved in an upward direction by the connecting rod and the crank and the pitch angle of the propeller is decreased, and
    while the tilt angle changes from the predetermined angle to 0 degree, the pitch control rod is moved in a downward direction by the connecting rod and the crank and the pitch angle of the propeller is increased.

5. The tilt prop aircraft of claim 4, wherein the predetermined angle is determined by adjusting length of the connecting rod and position of the crank.

6. The tilt prop aircraft of claim 1, wherein the first power transmission member is a first gear, the second power transmission member is a second gear, and the first gear and the second gear are geared with each other.

7. The tilt prop aircraft of claim 6, wherein the first gear is a tilt worm gear, and the second gear is a tilt worm wheel gear.

\* \* \* \* \*